July 15, 1958  D. O. WILLARD  2,842,843
INSIDE TUBE CUTTER
Filed Nov. 1, 1957

INVENTOR.
DELBERT O. WILLARD
BY
ATTORNEY

United States Patent Office 2,842,843
Patented July 15, 1958

2,842,843

INSIDE TUBE CUTTER

Delbert O. Willard, Sulphur, La.

Application November 1, 1957, Serial No. 693,961

8 Claims. (Cl. 30—106)

This invention relates to new and useful improvements in rotary inside cutting tool and is used to cut off tubes and the like from the inside of the tube at any desired length.

An object of the invention is to provide a rotary inside cutting tool which may be rotated from a horizontal or vertical position or any variation of either and fed forward to cause the cutting element thereof to cut off the tube from the inside at any desired or predetermined place.

Another object of the invention is to provide a tool of the character described adapted to be made in varying lengths in order to cut off tubes at very short distances such as in boiler tubes or tubes in a bundle sheet in order to remove and repair same quickly, or to cut off tubing, drill pipe or casing in deep wells, such as oil, gas and water wells, or the like which may be many thousands of feet below the surface of the ground in a well hole.

A further object of the invention is to provide a tool of the character described which can be operated by convenient hand powered rotary tool to cut off boiler tubes behind the flue sheet or tubes behind tube sheet in tube bundles and to remove the defective tubes and replace same with new tubes, or which tool may be operated by rotary mechanical equipment such as drilling rig for oil, gas and water wells and the like imparting rotation to said tool by means of rotary table of drilling rig using coupled drill pipe of great length or the like as the shank to connect to the tool for imparting rotation thereto.

A still further object of the invention is to provide a tool of the character described which may be made of such varying size because of its unique construction and arrangement of the parts that it may be used inside tubes of very small diameters which cannot be cut from the inside by any known inside cutting tool, and in this respect, said tool may be made so very small without impairing its efficiency and is adapted to operate and cut off such small diameter tubes that no other tool is capable of performing within these critical limits.

A still further object of the invention is to provide a tool of the character described, the cutting element of which may be rotated from an eccentric or concentric position with respect to the vertical central axis of the mandrel of said tool on and through which the cutting element is operated.

A still further object of the invention is to provide a tool of the character described, the cutting element of which may be rotated by a shank or stem and upon rotation of the shank or stem rotation is imparted to the entire tool by the driving relationship between the said shank or stem and another member of the combination comprising the tool.

These and other objects of the invention will in part be obvious and will in part be more fully disclosed in the specifications, the drawings of which show by way of illustration one embodiment of the invention, in which:

Fig. 1 is a vertical side view, partly sectional, showing the tool within a tube beaded or rolled into a tube sheet and the shank or stem of said tool with a cutting element on one end and a holding portion or chuck end on the other end for the reception of chuck jaws or the like or other holding means whereby rotation may be imparted to said shank or stem and said shank or stem having flattened sides and is shown in operatitve and retracted position within and registering with the flattened sides of an opened groove with the inclined end of said shank or stem carrying the cutting element adapted to bear and slide along the inner inclined shoulder near the end of said opened groove during the rotation of said shank or stem for feeding the cutting element laterally into the wall of the tube to cut through said wall and cut off the tube upon rotation and feeding forward of said tool within said tube;

Fig. 2 is a vertical side view, partly sectional, similar to Fig. 1 but in extended operative position with the shank or stem moved outwardly laterally having completed the cut through the wall of the tube showing the shoulder on the enlarged portion of the shank in abutment with the arresting shoulder in the countersunk hole to indicate to the operator that the wall of the tube has been cut through and the tube cut completely off;

Fig. 3 is an end view of Fig. 1, showing the triangular chuck end and the enlarged portion of the shank and the elongated slot to accommodate the lateral movement of the enlarged portion of the shank therein as well as the opened groove in the mandrel through which the flattened sides of the forward end of the shank may likewise move laterally upon rotating the tool and feeding the same forward so that the cutting element will effect a circular cut through the wall of the tube into which said inside cutting tool is inserted for making inside cut through the wall of said tube;

Figure 1:
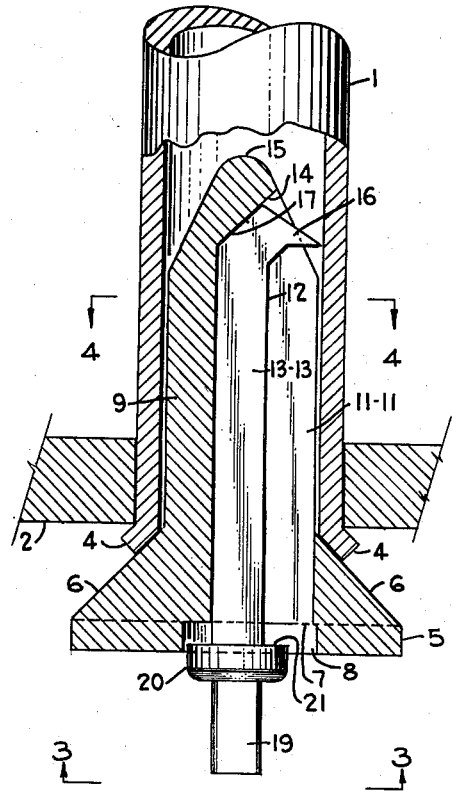

Referring to the accompanying drawings in which like numerals herein denote like numeraled parts therein in the various views, the numeral 1 denotes a tube whose end 4 is rolled or beaded so as to make fluid-tight joint with the tube or bundle sheet 2 and for securing the same to said tube or bundle sheet. The other end of the tube may be fitted into another tube or bundle sheet at the other end in like manner, as this is the usual construction for tube or bundle sheets, for example, as used in oil refining units or the like or in boilers or the like. Oftentimes these tubes become pitted, worn, leak, have holes in them or become damaged or clogged with residue that it requires removing said tubes and replacing same with new ones for which the rotary inside cutting tool has been designed to easily and quickly cut off said tube such as at 3 and at a point inside the tube sheet so that the cut will be smooth and the smooth fragmentary end of the pipe may be easily driven back through the tube sheet quickly without damage to the tube sheet and another tube inserted in its place and rolled or beaded on its end to effect a fluid-tight joint between said tube and said tube sheet and for securing said tube to said sheet on one end and in like manner on the other end to a like tube sheet. This is one purpose and use of my rotary inside cutting tool; however, said tool may be employed to cut off tubing, drill pipe, casing or the like in oil, gas or water wells or the like where the need arises in order to remove the pipe from the well hole as in the case of stuck drill pipe used in rotary drilling well bores into the earth formations, or to recover tubing or casing in said wells for salvaging same, or for removing the same from well. Generally, in case of drill pipe so as to free the hole of junked or stuck drill pipe or the like it becomes necessary to cut the pipe off many times and remove same in small sections or a few joints at a time until all of the pipe is removed from the well, which is a costly and laborious task. Many times when the well is quite deep it becomes necessary to drill with drill pipe having a rather small inside diameter hole therethrough and if the drill pipe of this small inside diameter becomes stuck or fastened in the well, it may be that it is impossible to remove the pipe from the well by other rotary inside cutting tools, because said tools of known design cannot be made to fit inside this small inside diameter hole in such small drill pipe, and, if there is not enough space between the outside of the drill pipe and inside of the casing through which the drill pipe is working and drilling when it becomes stuck, which is often the case in deep wells, then the entire well has to be abandoned with the drill pipe lost, and the casing set in the well becomes a total loss, plus the cost of drilling the well hole, which in deep wells amounts to great costs and consequent loss if the well has to be abandoned. Since my rotary inside cutting tool can easily work in such small inside diameter hole in such small drill pipe, tubing, casing or any kind, it is possible to cut the pipe with my tool and remove same and thus salvage most of the drill pipe and clean up the well for further drilling ahead and save the well to the projected depth anticipated. This may be done by the use of my rotary inside cutting tool due to the fact that it can be made of such critically small size without impairing its efficiency because of its unique construction and arrangement of the parts, especially since the tool 1 is comprised of only two parts, both of which are interfitted into each other and have a working relationship with each other that makes for simple, as well as positive, operating efficiency, and yet, even when made of very small size of down to one-quarter inch in diameter or less, is sturdy of construction, quick and efficient in operation.

The rotary inside cutting tool may be better understood from a detailed description thereof, in which the numeral 5 denotes the enlarged bevelled portion of the mandrel which is adapted to bear against the inner rolled or beaded edge of end 4 of the tube 1 as in the case of tube 1, in boiler or tube bundle in a flue or bundle sheet indicated at 2. The tube 1 is to be cut off as at 3 so as to perform a smooth cut so the exterior surface of the tube is uniform and smooth and can be easily driven back through the sheet 2, and, another tube replaced in the sheet 2 and the ends rolled or beaded so as to effect a fluid-tight seal between the tube and the sheet. It is understood that in the usual construction that boiler flue sheets or tube bundle sheets have many holes therethrough into which tubes are fitted therethrough and the ends thereof rolled or beaded to the exterior surface of the sheet to make fluid-tight seal between the tubes and the sheet. When these tubes become impaired by pits, holes, leaks, damaged or become clogged up they have to be removed and replaced. The cost of removing and replacing same as now done is by chisel and hammer because in refining processes tube bundles particularly have tubes of very small size, down to one-half inch inside diameter, and there is no inside cutting tool made of such critically small sizes that can be used to cut the tubes from the inside and replace same, unless the whole tube bundle is removed and pulled out, as for example in oil refining units, and replaced with an entire new tube bundle. This is a very expensive operation and is a problem confronting the industry from which there has been no solution until the present invention. Oftentimes there are a few tubes damaged and when the inspection plates are removed and upon cleaning and polishing the inside of the tubes these defective tubes are found, and, since there is no way to cut them out and replace them while the tube bundle is in place the defective tubes have to be plugged, or the entire bundle removed, if there are too many defective tubes, which lowers the efficiency of the on-stream production of refined products passing therethrough, for example, as in the case of oil refining. In which case, with the present invention the defective tubes can be cut off and repaced in a quick and efficient manner and the tube bundle placed back in service at full operating capacity, without removing the tube bundle from its place of installation in the refining unit.

The enlarged portion of the mandrel 5 may be bevelled as at 6 or it may be bevelled for a distance and be formed to provide a shoulder to bear against the inside edge of the rolled end 4 of the tube 1 so that only a slight amount of surface contacts the inside end of the rolled tube at the end 4 so that the mandrel 5 will rotate more freely when revolved. Leading from the enlarged bevelled portion 6 a smaller preferably rounded portion forms a barrel 9 of a dameter to fit loosely or snugly preferably a rather snug fit, through the bore of the tube 1. A rotary hand tool, powered by electricity or the like (not shown) of usual construction, is adapted to be fitted over the three sided chuck end 19 of the shank 12 for holding and imparting rotation to said shank 12. Said shank 12 has two opposed flat sides 13—13 which fit in close driving relationship within the two opposed flat sides 11—11 of groove 10 which runs lengthwise of the barrel of mandrel 5 from the shoulder 7 leading from the countersunk elongated hole 8 in the front face of the enlarged bevelled end 6 to the inclined shoulder 14 near the front end 15 of the barrel 9 of the mandrel 5. Said groove 10 is opened to one edge of the barrel 9. A cutting element 16 is carried at the forward inclined end 17 of the shank 12 and is provided with a cutting point 18 at the outer end of said cutting element 16, preferably of hard and sharp material, used for cutting steel and other hard substances as used in lathes and machine shops and the like. An enlarged portion 20 is provided forward of the chuck end 19 to provide an arresting shoulder 21 which abtus and bears against the shoulder 7 of the countersunk hole 8 when the cutting point 18 has finished cutting through the wall of the tube 1 and completely cut off the tube. This arresting shoulder 21 when an abutment to shoulder 7 is an indicator to the operator that the tube has been completely cut off since the operator has not any other way of knowing exactly that the tube has been cut off, because he cannot see the work performed by the cutting point, as it is hidden from view when the tube bundle is in place in the usual installation, therefore, when the arresting shoulder 21 has moved from its initial position before the cut is begun as shown in the positon in relation to shoulder 7 in Fig. 1 of the drawings, to abutment of said arresting shoulder 21 with that of shoulder 7 as shown in the abutting relationship in Fig. 2, the operator knows that the cutting point has cut through the wall of tube 1 and the tube is completely severed.

Figure 2:
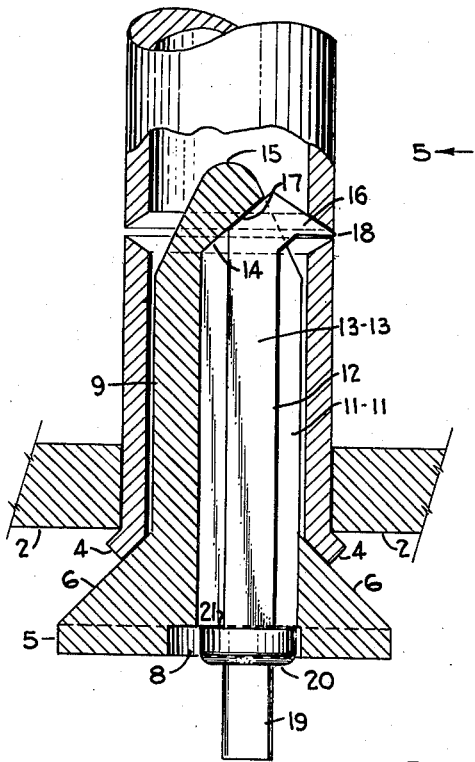
Figure 3:
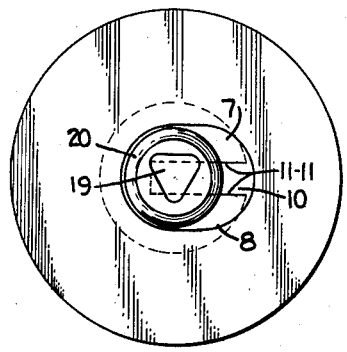
Figure 5:
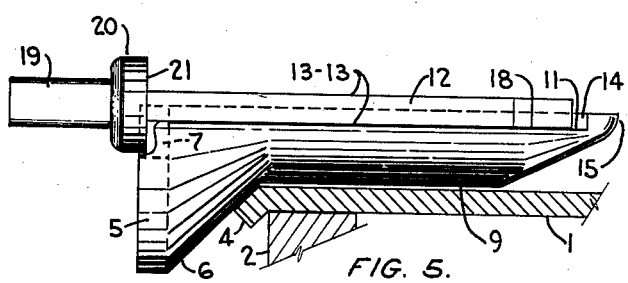
Fig. 5 is a vertical edge view taken on the line 5—5 of Fig. 2 showing detail of flattened sides of forward end of shank lying in groove of mandrel and the bevelled surface of the enlarged portion of the mandrel bearing against the inside rolled or beaded end of a boiler tube or sheet tube with a fragment of the flue or bundle sheet into which the flue is fitted.
Figure 4:
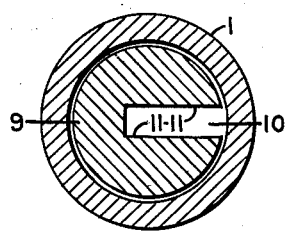
Fig. 4 is a sectional view taken on the line 4—4 of Fig. 1 showing the tube and the groove in the mandrel.

In the operation of the rotary inside cutting tool for cutting off a tube from the inside as shown in the drawings, a rotary hand tool powered usually by electricity having chuck jaws or other holding or clamping means (not shown) is fitted over the chuck end 19 of the integral shank 12 when the tool is inserted in the tube from end 4 as shown in Fig. 1 of the drawings, and, the rotary hand tool is activated to turn the rotary element thereof which is chucked or clamped to the chuck end 19 of the shank 12, which imparts rotation to the shank 12 which carries the cutting element 16 and rotates the same to cut a circular groove around the inside wall of the tube 1 at groove 3 to cut off the tube. As the shank 12 is rotated the opposed flat sides 13—13 of the shank 12, which fit and work between the opposed flat sides 11—11 of the groove 10 in the mandrel 5, imparts rotation to said mandrel 5, and, as the shank 12 is urged and fed forward by rotary hand tool the inclined face 17 of the shank 12 bears against and slides along the inner inclined face 14 at the forward end of the groove 10. This forward feed of the shank urged by the operator causes cutting point 18 to contact the inner wall of the tube 1 and to move outwardly and forwardly, and, causes the shank 12 to move in eccentric relationship to the vertical central axis of the mandrel 5 or the groove 10 thereof and as the inside cutting tool is rotated by the rotary hand tool the cutting point 18 smoothly and evenly cuts into the wall of the tube 1 and quickly and efficiently cuts off the tube 1, generally within 8 to 10 seconds in tubes of approximately one-half inch inside diameter having usual wall thickness in tube bundles used in the oil refining industry. Both smooth cut ends of the tube are driven back through the tube sheets on their respective ends and new tube replaced therein and rolled or beaded to make fluid-tight fit in a quick and inexpensive operation as compared to the hours used in removing same with chisel and hammer, as is done by the present method in use.

In cutting off drill pipe, tubing, casing or the like in oil wells, the shank is made up of small drill pipe or tubing or rods and rotated by the rotary table of the drilling rig with the barrel 9 of the mandrel fitting the pipe to be cut off with preferably a snug fit, and the enlarged portion 6 of the mandrel bevelled for a distance and having shoulder to rest on top edge of pipe to be cut off since its top end will be flat and not bevelled like the rolled end 4 of boiler tube or sheet tube.

It is obvious that many changes in detail of construction and arrangement of the parts may be made without departing from the spirit and scope of the invention as set forth in the appended claims.

Having thus described the invention, what I claim as new and desire to secure by Letters Patent is:

1. A rotary inside cutting tool for cutting off tubes from the inside including a mandrel with a reduced portion adapted to be inserted into said tube and an enlarged portion on said mandrel adapted to bear against the end of said tube, said mandrel having a longitudinal groove therein opened on one side of the reduced portion of said mandrel and closed on the other side of said reduced portion of said mandrel, a shank in non-rotatable relationship to said mandrel and in register with and movable longitudinally and laterally in said groove, one end of said shank carrying a cutting element and the other end of said shank providing means by which said shank may be rotated and fed forward endwise, said shank upon being rotated adapted to rotate said mandrel therewith and then fed forward is adapted to move outwardly forcing said cutting elements to cut circular groove around inside of said tube to cut off said tube.

2. A rotary inside cutting tool for cutting off tubes from the inside including a mandrel with a reduced portion adapted to be inserted into said tube and an enlarged portion on said mandrel adapted to bear against the end of said tube, said mandrel having a longitudinal groove therein opened on one side of the reduced portion of said mandrel and closed on the other side of said reduced portion of said mandrel, an inclined shoulder in the end of said groove against which an inclined end of said shank is urged to force said cutting element carried by said shank outwardly to engage and cut through said tube, a shank in non-rotatable relationship to said mandrel and in register with and movable longitudinally and laterally in said groove, one end of said shank carrying a cutting element and the other end of said shank providing means by which said shank may be rotated and fed forward endwise, said shank upon being rotated adapted to rotate said mandrel therewith and then fed forward is adapted to move outwardly forcing said cutting elements to cut circular groove around inside of said tube to cut off said tube.

3. A rotary inside cutting tool for cutting off tubes from the inside including a mandrel with a reduced portion adapted to be inserted into said tube and an enlarged portion on said mandrel adapted to bear against the end of said tube, said mandrel having a longitudinal groove therein opened on one side of the reduced portion of said mandrel and closed on the other side of said reduced portion of said mandrel, a shank in non-rotatable relationship to said mandrel and in register with and movable longitudinally and laterally in said groove, one end of said shank carrying a cutting element and the other end of said shank providing means by which said shank may be rotated and fed forward endwise, said shank upon being rotated adapted to rotate said mandrel therewith and then fed forward is adapted to move outwardly forcing said cutting elements to cut circular groove around inside of said tube to cut off said tube, an arresting shoulder on said mandrel, an enlarged portion on said shank adapted to engage said arresting shoulder on said mandrel whereby endwise movement of said shank carrying the cutting element is arrested after the cutting element has been rotated and fed forward to cut off said tube.

4. A rotary inside cutting tool for cutting off tubes from the inside including a rotatable shank mounted non-rotatably on a mandrel, a cutting element carried by said shank, a portion of said mandrel and shank inserted in said tube to be cut off, said mandrel adapted to be rotated by said shank, said shank rotated and slidably engaged on said mandrel and fed forward therethrough and moved outwardly therefrom carrying said cutting element outwardly therewith for engaging and cutting off said tube.

5. A rotary inside cutting tool for cutting off tubes from the inside including a rotatable shank mounted non-rotatably in a groove in a mandrel, an inclined shoulder in said groove and an inclined end on said shank, a cutting element carried by said shank, a portion of said mandrel and shank inserted in said tube to be cut off, said mandrel adapted to be rotated by said shank, said shank rotated and slidably engaged on said mandrel and fed forward therethrough the inclined end of said shank engaging the inclined shoulder of said mandrel whereby said shank is moved outwardly therefrom carrying said cutting element outwardly therewith for engaging and cutting off said tube.

6. A rotary inside cutting tool for cutting off tubes from the inside including a rotatable shank mounted non-rotatably on a mandrel, a cutting element carried by said shank, a portion of said mandrel and shank inserted in said tube to be cut off, said mandrel adapted to be rotated by said shank, said shank rotated and slidably engaged on said mandrel and fed forward therethrough and moved outwardly therefrom carrying said cutting element outwardly therewith for engaging and cutting off said tube, an arresting shoulder on said mandrel, an enlarged portion on said shank adapted to engage said arresting shoulder on said mandrel whereby longitudinal and outward movement of said shank carrying said element is arrested after the cutting element has been rotated and fed forward to cut off said tube.

7. A rotary inside cutting tool for cutting off tubes from the inside including a rotatable shank mounted non-rotatably in a groove in a mandrel, an inclined shoulder in said groove and an inclined end on said shank, a cutting element carried by said shank, a portion of said mandrel and shank inserted in said tube to be cut off, said mandrel adapted to be rotated by said shank, said shank rotated and slidably engaged on said mandrel and fed forward therethrough the inclined end of said shank engaging the inclined shoulder of mandrel whereby said shank is moved outwardly therefrom carrying said cutting element outwardly therewith for engaging and cutting of said tube, an arresting shoulder on said mandrel, an enlarged portion on said shank adapted to engage said arresting shoulder on said mandrel whereby longitudinal and outward movement of said shank carrying said cutting element is arrested after the cutting element has been rotated and fed forward to cut off said tube.

8. A rotary inside cutting tool for cutting off tubes from the inside including a rotatable shank mounted non-rotatably in a groove in a mandrel, a cutting element carried by said shank, a portion of said mandrel and shank inserted in said tube to be cut off, said mandrel adapted to be rotated by said shank, said shank rotated and slidably engaged longitudinally on said mandrel and fed forward therethrough and moved outwardly therefrom carrying said cutting elements outwardly and forwardly therewith for engaging and cutting off said tube.

No references cited.

UNITED STATES PATENT OFFICE

CERTIFICATE OF CORRECTION

Patent No. 2,842,843                                            July 15, 1958

Delbert O. Willard

It is hereby certified that error appears in the printed specification of the above numbered patent requiring correction and that the said Letters Patent should read as corrected below.

Column 4, line 21, for "dameter" read -- diameter --; line 45, for "when 'an'" read -- when in --.

Signed and sealed this 21st day of October 1958.

(SEAL)
Attest:
KARL H. AXLINE
Attesting Officer

ROBERT C. WATSON
Commissioner of Patents